United States Patent [19]

Firmin

[11] 4,069,610
[45] Jan. 24, 1978

[54] STUD WORM FISHING LURES

[76] Inventor: Herman P. Firmin, 11325 Granberry St., Baton Rouge, La. 70811

[21] Appl. No.: 733,527

[22] Filed: Oct. 18, 1976

[51] Int. Cl.² ............................................. A01K 85/00
[52] U.S. Cl. ................................... 43/42.24; 43/42.31
[58] Field of Search ................ 43/42.24, 42.26, 42.31; D22/27

[56] References Cited

U.S. PATENT DOCUMENTS

| | | | |
|---|---|---|---|
| 662,139 | 11/1900 | Warren | 43/42.24 |
| 3,100,360 | 8/1963 | Creme | 43/42.24 X |
| 3,122,853 | 3/1964 | Koonz et al. | 43/42.24 |
| 3,905,147 | 9/1975 | Snipes | 43/42.31 X |
| 3,978,606 | 9/1976 | Riggs | 43/42.24 |
| 3,983,656 | 10/1976 | Bain | 43/42.24 |
| 3,988,851 | 11/1976 | Sacharnoski, Sr. | 43/42.31 |

Primary Examiner—Russell R. Kinsey
Assistant Examiner—Daniel J. Leach
Attorney, Agent, or Firm—Llewellyn A. Proctor

[57] ABSTRACT

An aquatic fishing lure for use with a rod, line and hook, and usually a reel, in the form of a worm comprised of a slender, elongated, soft plastic material inclusive of head, body and tail portions. The body, and suitably the head and tail, is provided with a plurality of studs or projections, preferably hollow studs or projections, which extend perpendicularly outwardly to create simulated movement, and by virtue of which air is trapped, particularly within the hollow openings, to form bubbles which are evolved when the lure is cast into water to simulate live action. Preferably, the body is also hollow, and contains a rattler for creating additional livelike sounds. The worm lure is conveniently injected molded, and the invention also includes a mold suitable for the formation of stud worm fishing lures.

11 Claims, 7 Drawing Figures

STUD WORM FISHING LURES

The basic food supply of all animals, including fish, is plant life; but for the most part the plant life found in water is relatively sparse and often too tiny to be directly utilized by the majority of fish. Hence, the plant life supports smaller forms of animal life which eventually serve as food for most fish of interest to the sports fisherman, or angler. Fish utilize every available source of food. Many eat insects that drop on the surface of the water by chance, eat the aquatic larvae of terrestrial insects, or various small creatures that inhabit the land and live in or near the water.

In sports fishing, therefore, lures are often fashioned with silk, fur, feathers, wood, metals, plastics and other materials to imitate bait such as fish, shrimps, frogs, insects, worms, and the like. The lures, which are of various colors and shapes, are provided with one or more appended hooks; generally a hook which is wholly or partially concealed within the material of which the lure is constructed. Lures of such types are usually designed for use with rod, reel and line, the line of which is often directly affixed to the lure or to the hook which is secured to the lure.

Bait casting or spinning is known the world over, but is the North American term for casting out a bait, plug or lure and recovering it with a multiplying reel. Probably the most interesting kind of casting in this country is that practiced for bass. These sporting fish often lie in weedy water in the vicinity of snags such as old logs. Careful accuracy by the angler is essential to place the bait or lure at the spot where the bass is believed to lie, and an attempt is made to drop the lure precisely in the right place. Having cast the lure to where the bass is believed to lie, the angler moves the bait gently to cause a slight commotion on or just below the surface such as would be caused by a swimming fish, frog, worm or other small creature. The accuracy needed, the savage way in which a bass takes the lure, and the excitement of working and watching the lure makes bass fishing one of the most exciting sports to many sports fishermen.

Some lures have been designed to dip and dive, spin and wobble, pop and gurgle, in efforts to create live action. The large number of such devices attest to man's ingenuity, his continuing desire to fish as a sport, and an intense desire to improve the sport.

It is accordingly the primary objective of the present invention to provide a new and novel artificial bait or lure, notably one designed to create its own life-like or live action.

A specific object is to provide an artificial lure of such character, particularly one especially suitable for bait casting or spinning.

A further object is to provide an artificial lure of such type which can be constructed in a variety of sizes, shapes and colors, especially one which can be molded at low cost.

Another object is to provide a mold particularly useful for the production of lures or bait of such character.

These objects and others are achieved in accordance with the present invention, an article of manufacture constituting an artificial worm type lure for use in fishing with rod, line and hook, and usually a reel. The worm is comprised of a slender, elongated, soft plastic material inclusive of head, body and tail portions. The body, and suitably the head and tail, is provided with a plurality of studs or projections, preferably hollow studs or projections, which extend perpendicularly outwardly to create simulated movement, and vibrations, and by virtue of which air is trapped, particularly within the hollow studs or projections to form bubbles which are evolved when the lure is cast into water to simulate live action. Preferably, the body is also hollow, and contains a rattler for creating additional life-like noises. The worm lure is conveniently injected molded, and the invention also includes a mold suitable for the formation of the stud worm fishing lures.

These features and others will be better understood by reference to the following detailed description of the invention, and to the attached drawings to which reference is made. In the drawings, similar numbers are used to represent similar components in the different figures, and subscripts are used to designate a plurality of similar or analogous components.

Figure 1:
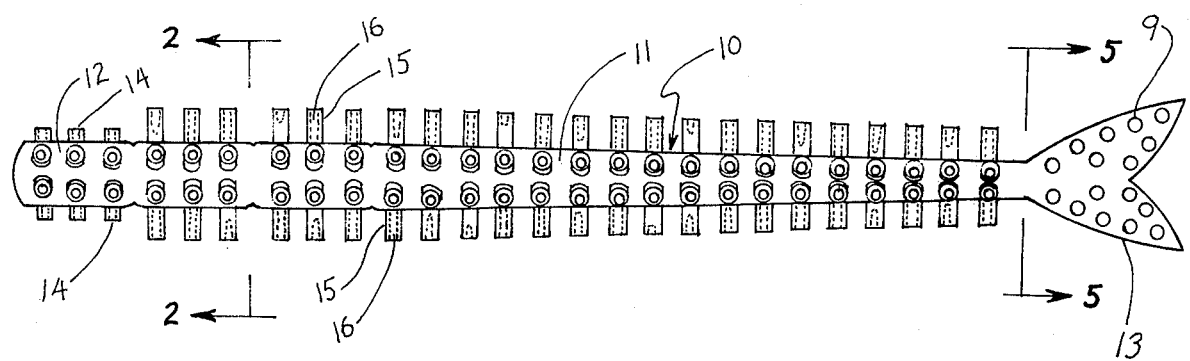
FIG. 1 depicts a view of a preferred type of lure resembling a worm constructed of soft plastic.
Figure 2:
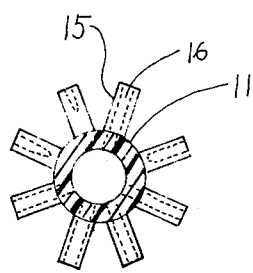
FIG. 2 is a sectional view taken through section 2—2 of the preceding figure.
Figure 3:
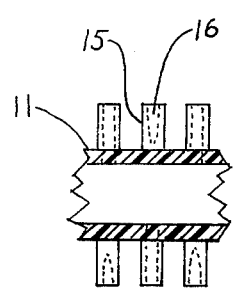
FIG. 3 is a fragmentary view, in cross-section, of a portion of the worm depicted in FIG. 1.

Referring to FIGS. 1-3 and 5, particularly to FIG. 1, there is shown a preferred type of worm lure 10, or lure constructed of relatively slender, elongated soft plastic generally shaped to resemble a worm. In general, the worm lure 10 is comprised of an elongate body 11, inclusive of a head portion 12 and a tail portion 13. The elongate body 11 is provided with a plurality of spaced apart rows of tubular shaped, hollow projections or studs 15. Suitably, the projections 15 are of length ranging from about two to about eight times, preferably from about two to about three times their diameter, and generally from about six to about ten, preferably from about six to about eight rows of the hollow studs 15 are arrayed along the length of the body 11. Generally from about twenty to about fifty, preferably from about twenty to about thirty hollow studs 15 are provided in each of the rows. Movement of the worm lure 10 causes these studs 15 to vibrate, and to create simulated movement, especially as the worm lure 10 is moved along the bottom of a stream. The head 14 is generally also provided with a plurality of rows of studs 14, also suitably hollow. The number of rows of the studs 14 correspond generally with those provided on the body 11, but generally no more than from about two to about five studs 14 are contained within each individual row. The tail 13 may or may not, but preferably contains a plurality of knob-like projections 9 arrayed upon the outer surface of the tail 13. Preferably, the tail 13 is shaped to resemble the caudal fin of a fish.

The hollow studs 15, and to a lesser degree the hollow studs 14, provide a quite unique function in that air is trapped within the reed-like openings 16 and hence when the worm 10 is submerged in water the air is gradually released to create a life-like action. Bubbles of air are released, gradually as the worm sinks or is drawn through the water. The bubbles of air not only create the appearance of life, but also the sounds of life which has the effect of arousing the curiosity and rapacity of fish.

Figure 4:
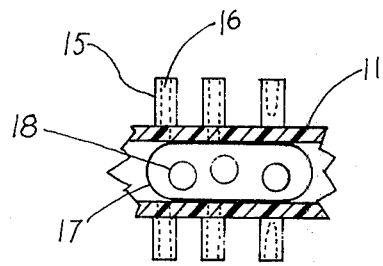
FIG. 4 is a fragmentary view, in cross-section, of a portion of the worm as characterized in FIG. 3 inclusive of a rattler or noise-maker added thereto.
Figure 5:
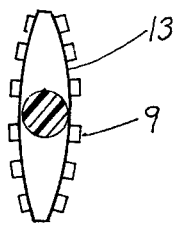
FIG. 5 is a sectional view taken through section 5—5 of FIG. 1.

Generally, and preferably, the body 11 of the worm lure 10 is hollow throughout most of its length, the openings 16 within the studs 15 extending generally to the wall which forms the body 11, though some of the openings 16 are relative short while others extend into the body opening. Preferably, a rattler 17 comprised of a capsule which contains a plurality of beads 18 (FIG. 4) is inserted within the body cavity to create noises which, with the escaping bubbles of air, simulate live action to further arouse the curiosity and rapacity of fish.

Figure 6:
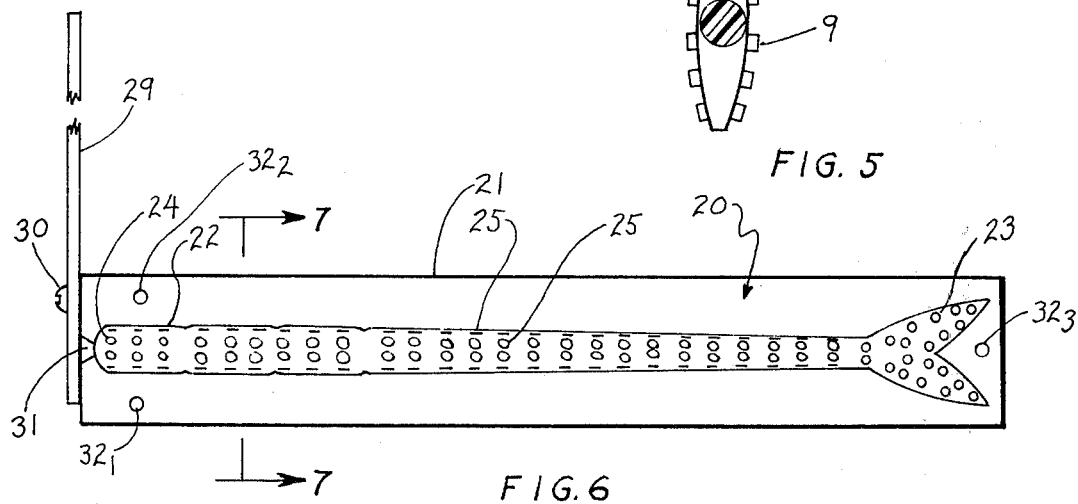
FIG. 6 is a mold half which, with a similar mating section (not shown), can be used to form the worm type lure depicted by reference to FIG. 1.
Figure 7:
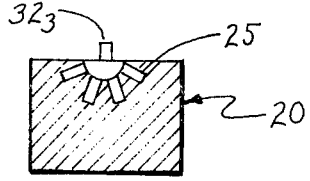
FIG. 7 is a sectional view taken through section 7—7 of FIG. 6.

The worm lure 10 can be formed in an injection molding apparatus 20, as depicted by reference to FIGS. 6 and 7, from a soft elastomer, plastic or plastic-like material, suitably from a commercially available material known as worm plastic. The mold 20, one section of two similar mating sections of which is shown in the figures, is comprised of a thick body portion 21 within which is provided a cavity of shape similar to that of the worm lure 10. The wall 21 thus surrounds a cavity within which contiguous portions, i.e., the head portion 22, body portion and tail portion 23, of a worm lure 10 can be formed. In the formation of a worm lure 10, a second mold section (not shown) is fitted upon the other via guide studs $32_1, 32_2, 32_3$. The mold sections are then locked tightly together. The handle 29, pivotally connected upon the front face of the mold segment 20 via a screw 30, is moved to uncover the channel 31 which leads into the mold cavity. Soft plastic, suitably a heated, molten worm type plastic, is then injected under pressure into the cavity via channel 31, the molten plastic flowing into and filling the head portion 22 and the minor openings 24 which forms the studs 14 on the head 12 of the worm lure 10, then into the body portion of the cavity and into the minor openings 25 to form the body 11 and studs 15 of the worm lure 10, and then into the tail portion 23 and minor openings therein to form the tail 13 and generally solid studs 9 of the worm lure 10. When sufficient plastic has been injected into the cavity the channel 31 is then closed.

After cooling, the die sections are then unlocked, and separated one from the other. On removal of a worm lure 10 from the mold 20 it is found that well formed hollow studs 15 are formed within the closed openings 25. Moreover, in large part, the studs 14 which are formed within the closed openings 24 are fairly well formed, and hollow, as often are the knobs 9 located on the tail 13. The body 11 of the worm lure 10 itself, thus formed, is hollow, providing a fit receptacle for a rattler 17. The head portion 12 of the worm lure 10 is solid, this providing a convenient location for attachment of a hook, suitably a properly weighted hook adequate to sink the worm lure 10.

In the formation of a worm lure 10, the plastic apparently first solidifies along the walls of the various openings while the plastic mass at the centers of the various openings remains in molten form. The changing pressure within the mold, produced by cooling and solidification of the plastic, causes movement, or flow of the molten plastic. Channels are thus spontaneously formed within the studs 15, and to a somewhat lesser extent within the relatively short studs 14; and often within the knobs or studs 9, the molten plastic apparently being carried into the body 11 of the worm lure where it is deposited adjacent the walls, and within the head and tail portions 12,13 of the worm lure 10.

It is apparent that various modifications and changes can be made, e.g., as in the size, shape and materials of construction, without departing the spirit and scope of the invention.

Having described the invention, what is claimed is:

1. As an article of manufacture, a worm type aquatic fishing lure for use with a rod, line and hook, by virtue of which the lure can be attached via the line to the rod and used in casting, comprising a slender, elongated, soft, elastic material, constituting a solid head portion, hollow body, and tail portion, which generally resembles a worm, and a plurality of hollow studs which extend perpendicularly outwardly from said body, whereby on casting the worm into water the studs vibrate and create simulated movement, and bubbles of air are released as the worm sinks or is drawn through the water, the release of air creating life-like appearance and sounds.

2. The article of manufacture of claim 1 wherein the studs on the head and tail portions of the lure are hollow, and the tail portion of the worm is shaped to resemble the caudal fin of a fish.

3. The article of manufacture of claim 1 wherein the worm type fishing lure is constituted entirely of worm type plastic.

4. The article of manufacture of claim 1 wherein the body of the worm type fishing lure is hollow and provided with a rattler.

5. The article of manufacture of claim 1 wherein the rattler is comprised of a capsule which contains spherical shaped bodies which move about within the capsule to create noises.

6. As an article of manufacture, a worm type aquatic fishing lure for use with a rod, line and hook, by virtue of which the lure can be attached via the line to the rod and used in casting, comprising a slender, elongated, soft, elastic material, constituting a body which generally resembles a worm, and a plurality of studs of length ranging from about two to about eight times their diameter which extend perpendicularly outwardly from said body whereby on casting the worm into water the studs vibrate and create simulated movement, and bubbles of air are released as the worm sinks or is drawn through the water, the release of air creating life-like appearance and sounds.

7. The article of manufacture of claim 6 wherein the fishing lure is provided with a solid head portion, body and tail portions, and the studs which cover the body are solid.

8. The article of manufacture of claim 6 wherein the fishing lure is provided with a solid head portion, body and tail portions, and the studs which cover the body are solid and of length ranging from about two to about three times their diameter.

9. The article of manufacture of claim 6 wherein the tail portion of the worm is shaped to resemble the caudal fin of a fish.

10. The article of manufacture of claim 6 wherein the worm type fishing lure is constituted entirely of worm type plastic.

11. The article of manufacture of claim 6 wherein the studs are arranged about the length of the body in from about six to about eight rows, and from about twenty to about fifty studs are contained in each row.

* * * * *

Disclaimer

4,069,610.—*Herman P. Firmin*, Baton Rouge, La. STUD WORM FISHING LURES. Patent dated Jan. 24, 1978. Disclaimer filed Feb. 14, 1980, by the Inventor.

Hereby enters this disclaimer to claims 6 through 11 of said patent.

[*Official Gazette, April 8, 1980.*]